(12) United States Patent
Broussard et al.

(10) Patent No.: US 7,496,932 B2
(45) Date of Patent: Feb. 24, 2009

(54) COMMUNICATING WITH REMOTE OBJECTS IN A DATA PROCESSING NETWORK

(75) Inventors: Scott J. Broussard, Cedar Park, TX (US); Ying Liu, Austin, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1026 days.

(21) Appl. No.: 10/755,821

(22) Filed: Jan. 12, 2004

(65) Prior Publication Data

US 2005/0155044 A1     Jul. 14, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................................... 719/330
(58) Field of Classification Search .................. 719/330
See application file for complete search history.

(56) References Cited

U.S. PATENT DOCUMENTS

| | | | | |
|---|---|---|---|---|
| 5,999,988 A | * | 12/1999 | Pelegri-Llopart et al. | ... 719/330 |
| 6,446,070 B1 | * | 9/2002 | Arnold et al. | ................. 707/10 |
| 6,487,607 B1 | * | 11/2002 | Wollrath et al. | ............. 719/330 |
| 6,501,852 B1 | | 12/2002 | Clark et al. | |
| 6,842,786 B1 | * | 1/2005 | Webb | ......................... 709/230 |
| 7,107,592 B2 | * | 9/2006 | Taylor et al. | ................. 718/104 |
| 7,260,816 B2 | * | 8/2007 | Kar et al. | ..................... 717/136 |
| 7,281,252 B1 | * | 10/2007 | Lindquist et al. | ............ 719/332 |
| 2002/0120793 A1 | * | 8/2002 | Guthrie et al. | .............. 709/330 |
| 2003/0070006 A1 | * | 4/2003 | Nadler et al. | ............... 709/330 |
| 2004/0019596 A1 | * | 1/2004 | Taylor et al. | ................ 707/100 |

FOREIGN PATENT DOCUMENTS

| WO | 98/44414 | 10/1998 |
|---|---|---|
| WO | WO 98/44414 | 10/1998 |
| WO | WO 00/55727 | 9/2000 |

* cited by examiner

*Primary Examiner*—Thomas Lee
*Assistant Examiner*—KimbleAnn Verdi
(74) *Attorney, Agent, or Firm*—Matthew W. Baca; Amy J. Pattillo

(57) ABSTRACT

A method for invoking remote objects in a data processing system includes generating a serialized byte stream containing the remote object and its arguments, responsive to executing a remote object call. The serialized byte stream is sent to a server containing the object. Responsive to receiving a second serialized byte stream containing a result produced by the remote object and determining the presence of a second remote object, in the second byte stream, for which no reference can be found, information contained in the second serialized byte stream is used to determine the class type of the second remote object. A proxy compatible with the second remote object's class type, if not already existing, is automatically generated and compiled on the client or, if the proxy does exist, is loaded at run time to call the second remote object.

5 Claims, 4 Drawing Sheets

COMMUNICATING WITH REMOTE OBJECTS IN A DATA PROCESSING NETWORK

BACKGROUND

1. Field of the Present Invention

The invention is in the field of data processing networks and more particularly in the field of data processing networks in which remote objects are locally invoked.

2. History of Related Art

Java.RTM. (a trademark of Sun Microsystems) Remote Method Invocation (RMI) enables a programmer to create distributed Java applications in which the methods of remote Java objects can be invoked from other Java Virtual Machines, typically on different host systems. Java RMI is described in greater detail in the Java Remote Method Invocation Specification (Rev 1.9), from Sun Microsystems A remote object is defined as an object that implements the java.rmi.remote interface. For purposes of this disclosure, however, a remote object may be thought of as an object that is not loaded into the JVM that is attempting to call it.

A Java-based program can make a call to a remote object once it obtains a reference to the remote object, either by looking up the remote object using a naming service provided by RMI or by receiving the reference as an argument or a return value. A client can call a remote object in a server and that server can also be a client of other remote objects.

RMI uses object serialization to marshal and unmarshal arguments for remote object calls. Object serialization refers to the ability to read or write an entire object to and from a raw byte stream. It allows Java objects and primitives to be encoded into a byte stream suitable for streaming to some type of network, to a file-system, or more generally to a transmission medium or storage facility.

Referring to FIG. 1, a conceptual representation of traditional Java remote object invocation is depicted. In the depicted embodiment, a Java source code file (a .java file) 102 is compiled by javac compiler 106 on a client-side computer 101 to create Java byte code (a .class file) 110 that is executable by a Java Runtime Environment (JRE), which includes a Java Virtual Machine (JVM). JRE's and JVM's are well known in the field of Java programming.

Before executing the client-side application (i.e., the class file 110), an RMI compiler (rmic) 114 is used to create a stub file 118 and a tie or skeleton file 122. (Tie files are created in an embodiment based on the Internet Inter-orb Protocol (IIOP) while skeleton files are created in an embodiment based on the Java Remote Method Protocol (JRMP)). The stub file 118 is a proxy for the remote object. Stub file 118 is responsible for forwarding method invocations on remote objects to the server where the actual remote object implementation resides. Tie file 122 is the server-side analogy of stub file 118. Tie file 122 is used for returning objects and parameters to the client-side application.

Class file 110 contains a reference to a remote object 130 that is actually a reference to stub 118. When class 110 makes a call to remote object 130, stub 118 is the class file by which the remote object call is forwarded to the server where the remote object resides. Stub 118 performs this function by serializing the remote object call parameters and sending the serialized byte stream over the network using conventional TCP/IP. Tie file 122 performs a similar function on the remote object server-side.

Referring to FIG. 2, a conceptual representation of a conventional Java RMI run time sequence is presented. In the illustrated example, a class file 110 being executed by a corresponding JVM (not depicted) contains a call to a remote object 130. When the call to remote object 130 is executed, the remote call is effected through stub file 118. More specifically, a call to remote object 130, including any parameters and objects that are needed by the remote object, is passed (as represented by reference numeral 202) to the stub file 118. Stub file 118 is responsible for serializing the remote object call and the call's arguments and for sending (204) the serialized byte stream to a server-side JVM (not depicted) under which the remote object executes.

In the depicted illustration, the Java application file 110 and the remote object 130 reside on different machines with Java application file 110 being shown as residing on a "client-side" computer 201 and the remote object residing on a "server-side" computer 203. In this configuration, the communication of serialized bytes streams between client side 201 and server side 203 is preferably achieved using a conventional network protocol stack such as TCP/IP.

On server-side 203, a tie file 122 receives the serialized byte stream sent by stub file 118 and de-serializes or un-marshals the corresponding arguments to reconstruct the objects and parameters of the remote object call. The de-serialized objects and/or parameters are delivered (reference numeral 206) to remote object 130 for execution. Remote object 130 then executes server side 203 using the received objects and/or parameters and produces a resulting set of parameters and/or objects that are returned (reference numeral 208) to tie file 122. Tie file 122 serializes the arguments and sends (210) the serialized data back to client-side 201. Stub file 118 is then responsible for un-marshaling the serialized objects and parameters before returning (reference numeral 212) the un-serialized data to the client-side application.

Under certain circumstances, a stub for a particular remote object is not present on the client-side system and a "ClassNotFoundException" is generated. This situation can occur, for example, when the client side application does not have a direct reference for a remote object but instead retrieves a reference to a remote object from a naming service like Java Naming and Directory Service (JNDI). In this case, since one cannot anticipate at compile time what remote object will be returned by a call to the naming service, the programmer cannot assure that an appropriate stub will be present. In another example, a client-side call to a first remote object returns to the client-side a reference to a second remote object (either as a parameter in a call originated by the first remote object or as a return value to the client-side remote object call). In this situation, the name of the remote object that is returned from the server side is not knowable at compile time and the appropriate stub may not be present on the system. It would be desirable to eliminate this source of errors by implementing a method and system for creating "missing" stub class files to accommodate remote object calls that a client device needs to make. It would be further desirable if the implemented solution operated dynamically at run time to improve run time performance and reduce the amount of undesirable re-compilation.

SUMMARY OF THE INVENTION

A method for invoking remote objects in a data processing system includes generating a serialized byte stream containing the remote object and its arguments, responsive to executing a remote object call. The serialized byte stream is sent to a server containing the object. Responsive to receiving a second serialized byte stream containing a result produced by the remote object and determining the presence of a second remote object, in the second byte stream, for which no reference can be found, the method uses information contained in second serialized byte stream to determine the class type of the second remote object. A proxy compatible with the second remote object's class type is used to call the second remote object. Using the proxy for the second remote object includes determining whether a proxy compatible with the second remote object class type exists and, if so, loading the proxy at run time. Responsive to determining the absence of a proxy that is compatible with the second remote object class, a suitable proxy is generated at run time and used to call the second remote object. Determining whether a proxy is compatible includes determining whether a proxy for the second remote object class type exists and, if not, determining the most specific class type compatible with the second remote object and then determining whether a proxy for the most specific compatible class type exists.

BRIEF DESCRIPTION OF THE DRAWINGS

Other objects and advantages of the invention will become apparent upon reading the following detailed description and upon reference to the accompanying drawings in which.

Figure 1:
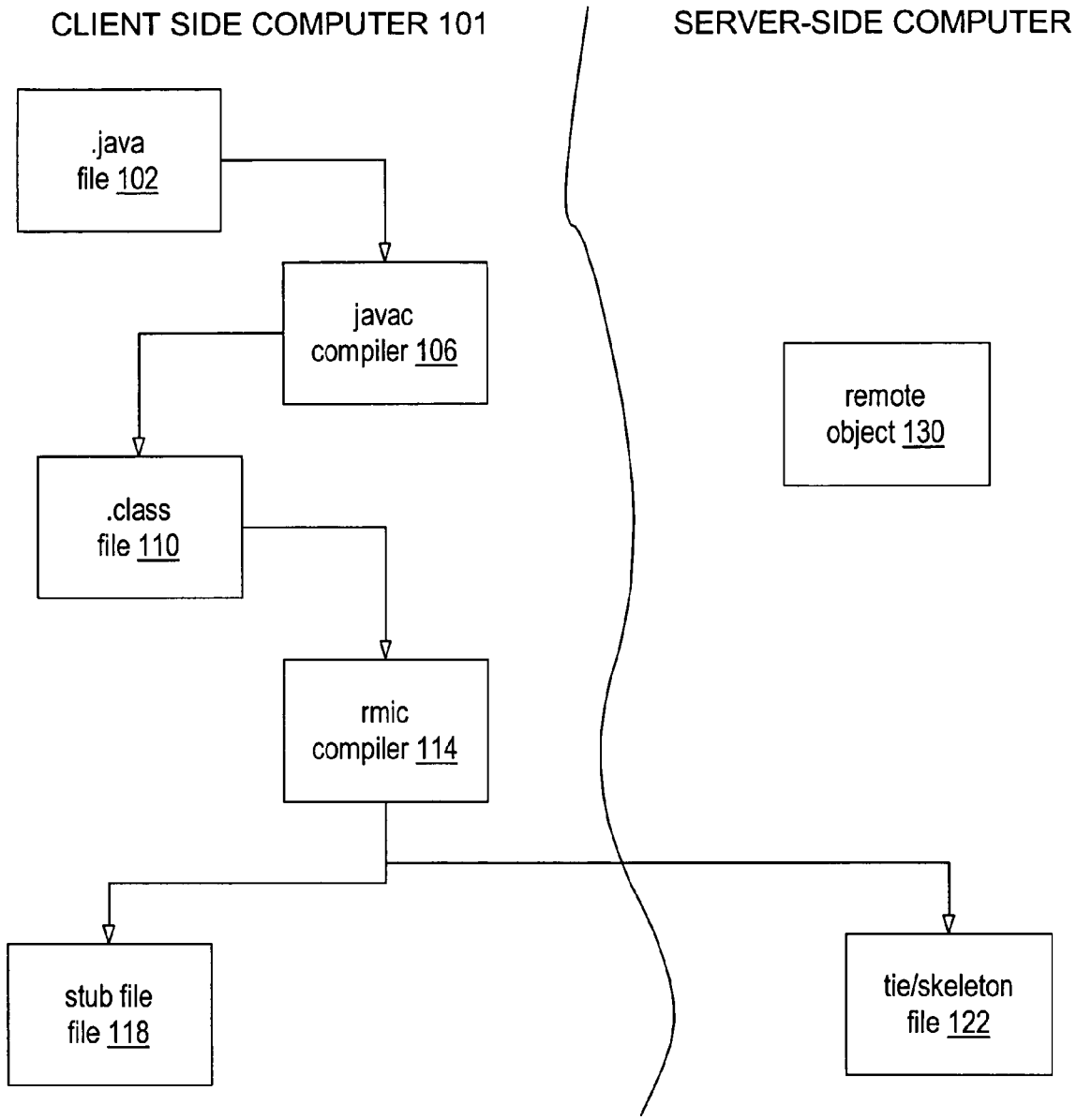
FIG. 1 is a block diagram of selected elements of a Java application using remote method invocation according to the prior art.
Figure 2:
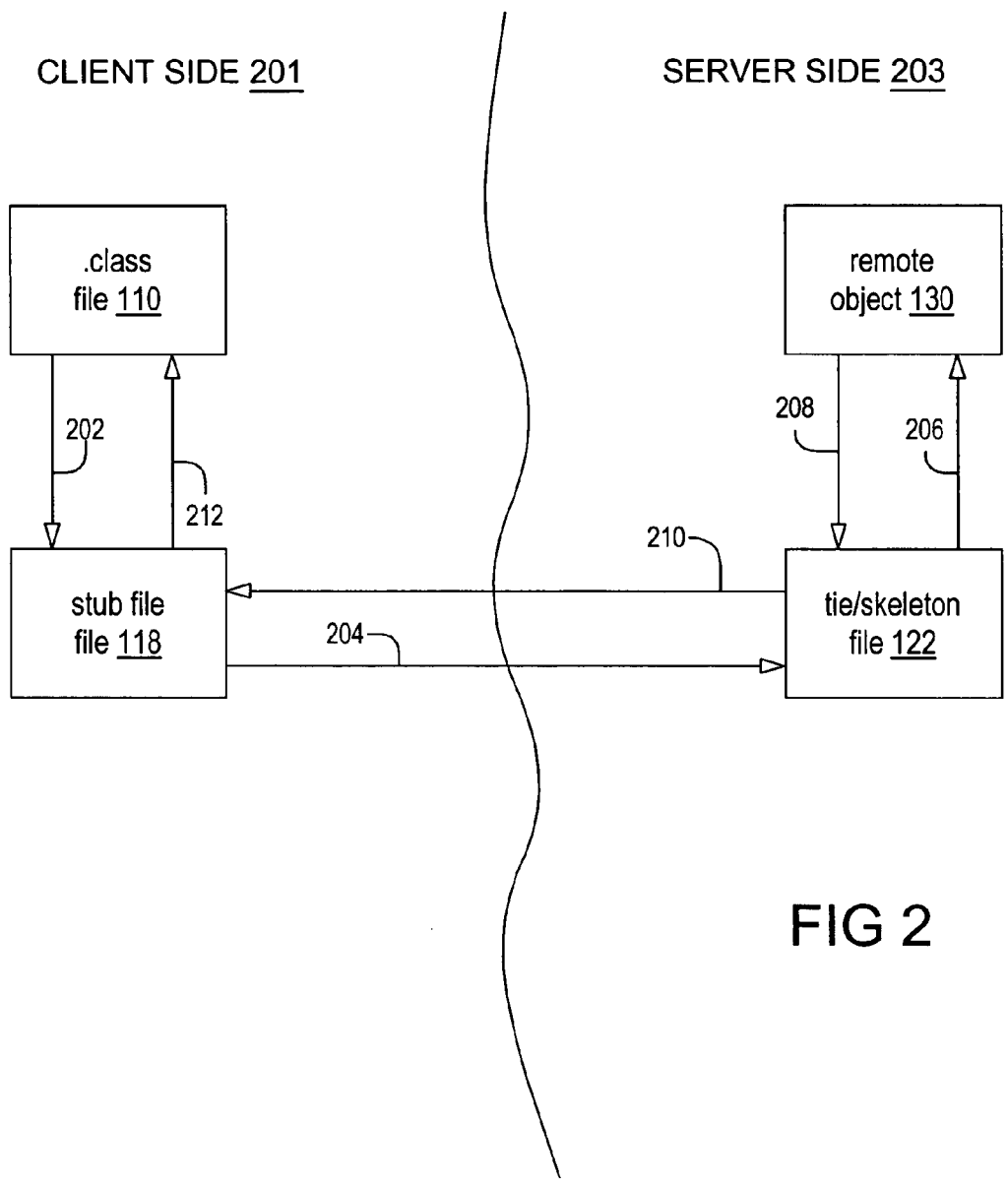
FIG. 2 is a conceptual diagram of the run-time environment of a the Java application of FIG. 1.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention is directed towards a method and system in which a Java runtime environment (JRE) is able to take corrective action when it executes a call to a remote object for which the JRE contains no stub. When a JRE encounters an object stub that can not be deserialized for a remote object, the JRE automatically generates an appropriate stub based on the class type of the remote object or on the class type of some other class or interface in the remote object's inheritance chain. Because all Java classes stem from a common root class, the client-side JRE will either recognize the class type of the remote object itself, a class from which the remote object class type is an extension, or an interface that is implemented by the object. Automatic stub generation is achieved using Java class type information that is transmitted with the remote object in conjunction with search and class loading capabilities inherent in any JRE. If the JRE does not have a stub for the most specific class type that is compatible with the remote object, a stub corresponding to that class type is automatically generated. In this manner, a recipient JRE is able to receive and process any remote object regardless of whether the JRE has specific knowledge of the remote object's type.

Substantial portions of the present invention may be implemented as a set or sequence of computer executable instructions, stored on a computer readable medium, for generating stubs needed to complete a call to a remote object in a Java technology based application or environment. The software may reside on a persistent medium such as a magnetic disk, magnetic tape, CD ROM, flash memory or other form of electrically alterable ROM. At other time, portions of the software may reside in a volatile storage medium such as the system memory (DRAM) or cache memory (SRAM) of a data processing system, typically a client-side computer, that is executing the software.

Figure 3:
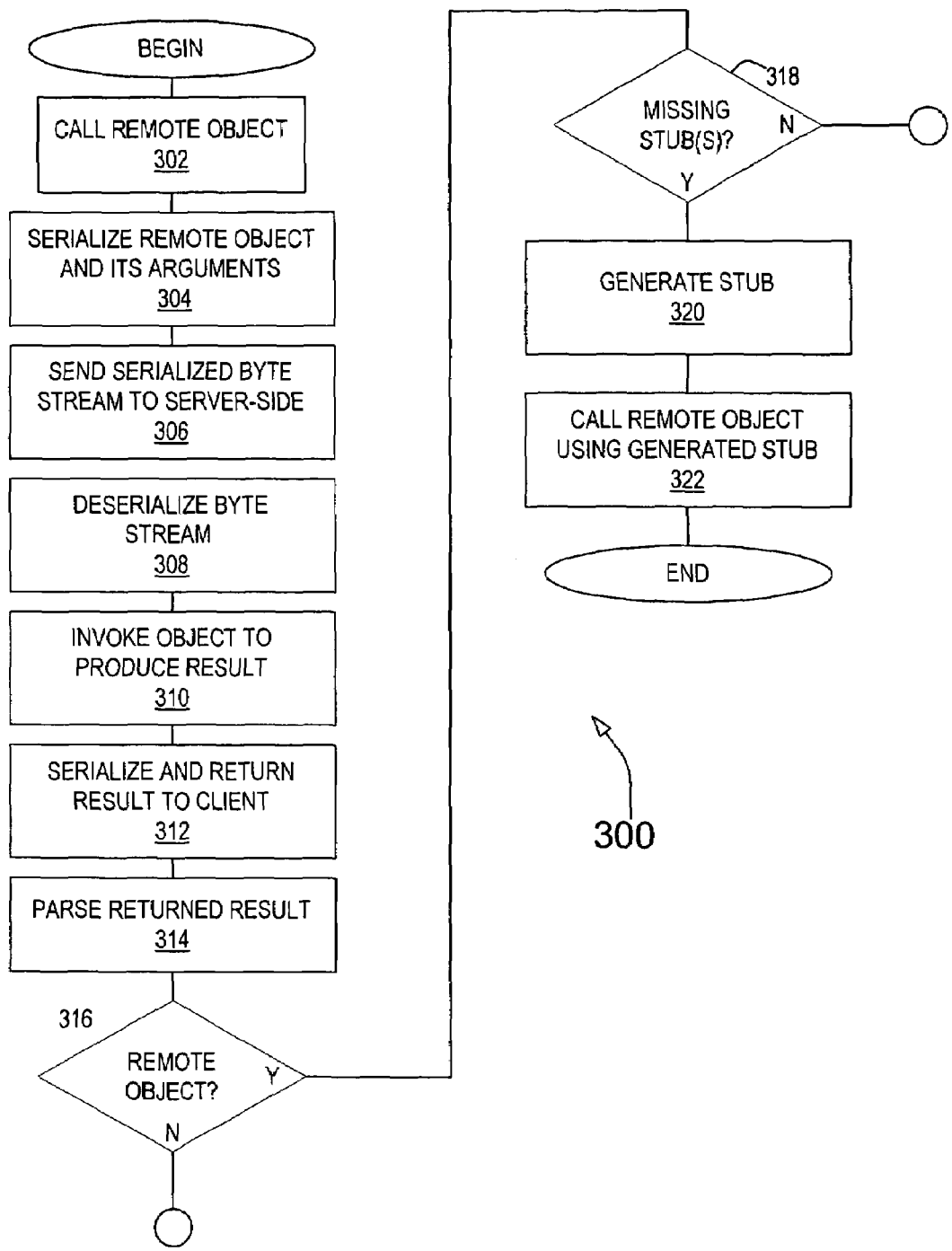
FIG. 3 is a flow diagram of a method and a corresponding computer program product for loading or generating appropriate stub files for a Java application that employs remote method invocation.

Turning now to the drawings, FIG. 3 is a flow diagram of a method 300 of executing a Java application in which a client device generates a client-side stub upon receiving a remote object for which the client has no corresponding stub according to one embodiment of the present invention. In the depicted embodiment method 300 initiates when a Java application executing on a client machine makes a call (block 302) to a remote object (referred to as the first remote object to differentiate this remote object from other remote objects). This is referred to herein as a direct call to the remote object. If the application is properly constructed, the JRE in which the application is executing (the client-side JRE) recognizes the remote object and has a stub class file corresponding to the remote object. The stub class file enables the JRE to forward the call to a remote JRE for execution.

In response to the remote object call encountered in block 302, the JRE will invoke the stub class file corresponding to the remote object to serialize (block 304) the remote call and send (block 306) the serialized byte stream to the JRE where the first remote object "resides" (the remote JRE or the server-side JRE). Serialization, as indicated above, includes the serialization of any arguments associated with the remote object or its corresponding methods.

Following receipt of the serialized byte stream, the remote JRE then de-serializes (block 308) the byte stream to reconstruct the objects that were sent with the remote object call. Having recovered the arguments that correspond to the remote call, the remote JRE is able to invoke (block 310) the remote object to produce a result that is returned (block 312) to the client-side JRE. The returned result may include a return value or a call, including one or more arguments, to another object. In the case of a return value, the return value itself may be an object that is remote with respect to the client-side JRE. Similarly, in the case of a returned object call, the arguments of the call may be remote objects.

Upon receiving the result returned from the remote JRE, the client-side JRE parses (block 314) the return values and/or parameters that it receives from the server side JRE. If the client-side JRE detects (block 316) a remote object, it then determines (block 318) whether it has a corresponding stub for the remote object(s). If the client side JRE determines that it lacks a stub class file for one or more of the remote objects returned from the server side JRE, it then generates (block 320) a suitable stub automatically and uses (block 322) the generated stub to call the remote object.

Figure 4:
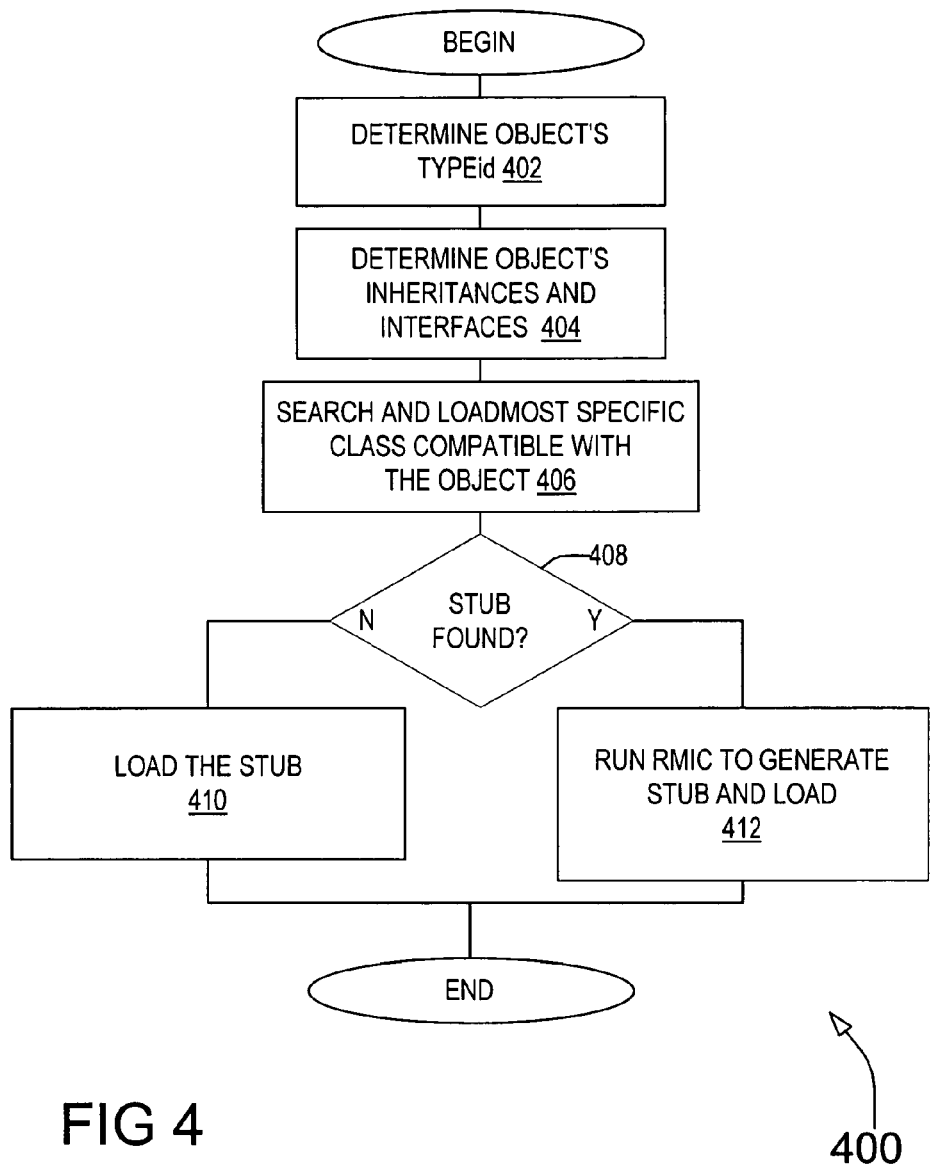
FIG. 4 is a flow diagram illustrating an embodiment of the automated stub loading/creation of FIG. 3.

In one embodiment, automatic generation of an appropriate stub is achieved as conceptually depicted in FIG. 4. As indicated previously, when an object is received as part of a serialized byte stream from a remote JRE, the client-side JRE first attempts to deserialize the object using an appropriate stub. When the JRE determines that a particular object cannot deserialize because no stub file corresponding to the class type of the object is loaded, the JRE first determines (block 402) class type information corresponding to the unrecognized remote object. To make this determination, one embodiment of the invention relies on "stringified" object references, referred to as Interoperable Object References (IOR's), embedded within the serialized byte streams that flow between the client-side and the server-side. An IOR contains typeID information that identifies the class type of the corresponding object reference. By parsing the IOR of a remote object for which no corresponding stub is found, the client side can determine the class type of the object.

The IOR typeID, possibly in conjunction with an additional record within the IOR, is used by the client-side JRE to determine (block 404) the inheritance characteristics of the object and the interfaces implemented by the object. From this information, the client-side JRE then uses the JRE's search order to find and load (block 406) the most specific class type that is compatible with the object. Each Java class (excepting the Object class itself) is derived from or "extends" another class. Each extension of a class "inherits" all of the state and behavior of its ancestor including the ancestor's methods and variables. Java's inheritance characteristic assures that all JRE's recognize an object's class type or the class type of an ancestor of the object. In many instances, the most specific class ancestor of an unrecognized remote object contains sufficient state and behavior to define and acceptable stub file for the object under consideration.

Once the most specific class type of a particular object has been loaded, the JRE can then determine (block 408) whether a stub file corresponding to that class exists. If the corresponding stub file does exist, the JRE loads (block 410) the stub file into the appropriate class loader. If the stub file does not exist, the JRE invokes (block 412) the RMI compiler against the appropriate interface to create a stub at run time. The compiles stub file is then loaded into the appropriate class loader. In this manner, the client-side JRE is able to resolve a remote object reference without having prior specific knowledge of the remote object's class type. In the preferred implementation, on-the-fly stub loading/creation is incorporated into the JRE itself. In other embodiments, this functionality is implemented as a Java class library extension.

It will be apparent to those skilled in the art having the benefit of this disclosure that the present invention contemplates a mechanism for enabling automated creation of stub files in a Java application that uses RMI. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method executing remote procedures in a client system, comprising:

responsive to a remote object call received by a client system, generating at the client system a first serialized byte stream containing a remote object and its arguments;

sending by the client system the first serialized byte stream to a server containing the remote object;

responsive to the client system receiving a second serialized byte stream containing a result produced by the remote object from the server and determining the presence of a second remote object for which no reference can be found at the client system in the second serialized byte stream, using information contained in the second serialized byte stream to determine the class type of the second remote object;

determining by the client system whether a proxy for the second remote object class type exists;

responsive to the client system determining that there is a proxy for the second remote object class type, loading the proxy at runtime at the client system; and responsive to the client system determining the absence of a proxy for the second remote object class type, determining a most specific class type compatible with the second remote object, generating a proxy of the most specific class type at run time and using the generated proxy to call the second remote object.

2. The method of claim 1, wherein generating a suitable proxy at run time comprises invoking at run time a compiler.

3. The method of claim 1, wherein the proxy comprises a stub file.

4. The method of claim 1, wherein using information contained in the second serialized byte stream to determine the class type of the second remote object comprises using TYPEid information in the second serialized byte stream.

5. The method of claim 4, further comprising using the second remote object's inheritance and interfaces to determine the class type of the second remote object.

* * * * *